H. W. Adams,
Glass Mold.
Nº 15,548.
Patented Aug. 19, 1856.
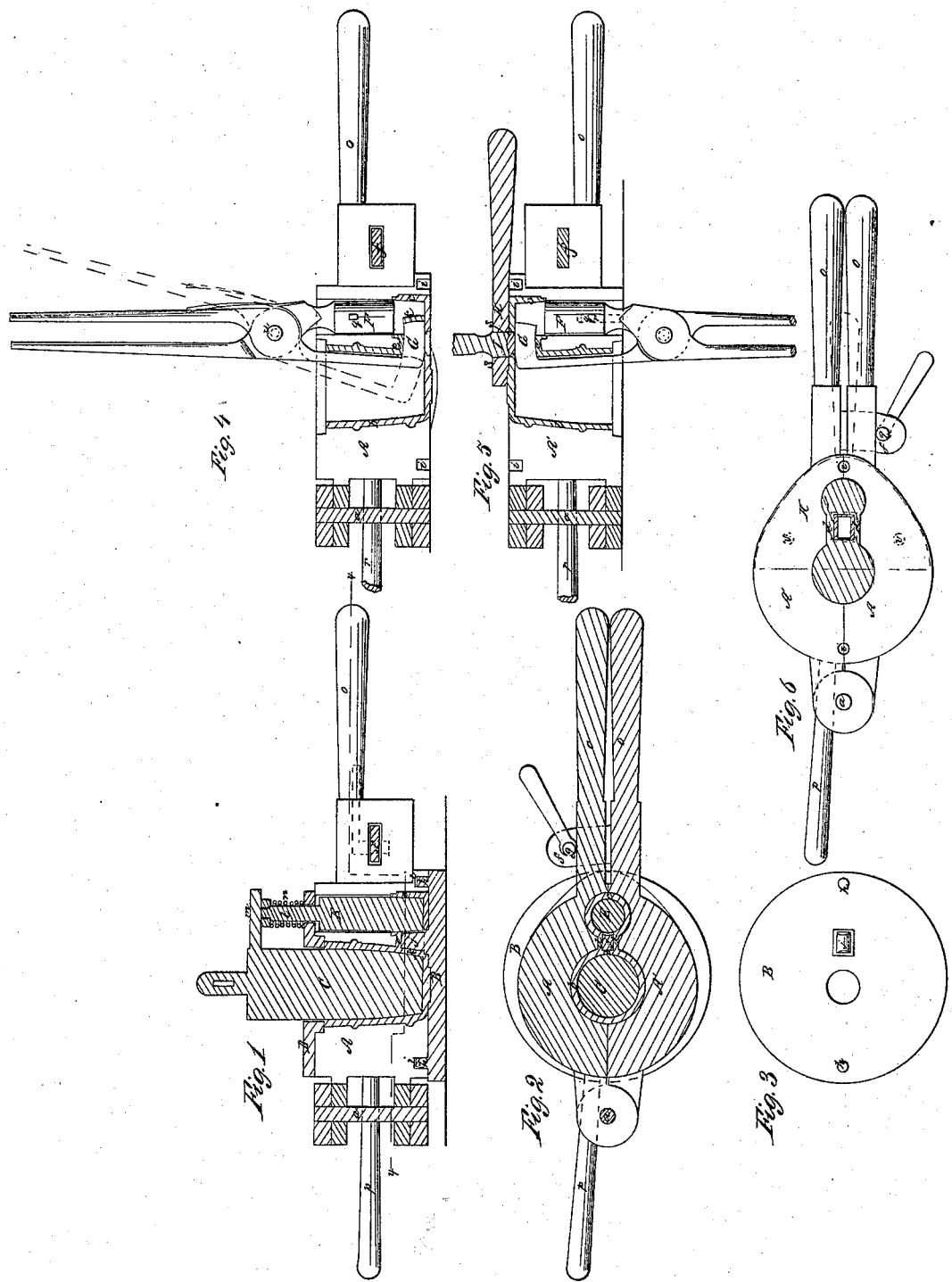

UNITED STATES PATENT OFFICE.

HENRY W. ADAMS, OF NEW YORK, N. Y.

MOLD FOR PRESSING GLASS FOUNTAIN-LAMPS.

Specification of Letters Patent No. 15,548, dated August 19, 1856.

*To all whom it may concern:*

Be it known that I, HENRY WRIGHT ADAMS, of the city, county, and State of New York, have invented a new Mold for Pressing Glass Fountain-Lamps; and I do hereby declare that the following is a full, clear, and exact description of the same, reference being had to the accompanying drawings, forming part of this specification, in which—

Figure 1, is a central section of the mold in the condition it is in at the termination of the first stage of the operation of making the lamp. Fig. 2, is a section taken in the line $x$, $x$, of Fig. 1. Fig. 3, is a plan of the bottom of the mold with the other parts removed. Fig. 4, is a central section of the mold in the condition it is in at a more advanced stage of the operation than is shown in Fig. 1. Fig. 5, is a central section of the same in the condition it is in, at a still more advanced stage. Fig. 6, is an inverted plan corresponding with Fig. 5.

Similar letters of reference indicate corresponding parts in the several figures.

The lamp for which this mold is intended has an upright circular reservoir, or as it is termed "fountain," and an upright circular cup on one side to receive the burners, and the reservoir and cup are connected by a horizontal passage. The manufacture of such a lamp of glass has been considered by glass manufacturers to be, if not impossible, an operation of very great difficulty. This mold renders the operation of making such lamps perfectly simple and easy.

To enable those skilled in the art to make and use my invention, I will proceed to describe its construction and operation.

The mold is composed of several parts some of which are changed for others at certain stages of the operation. The only portions of the mold which are employed throughout the entire operation are the two parts A, A', which are hinged together at $a$, and which produce the exterior of the sides of the reservoir $b$, and cup $c$, and also the sides $d$, $d$, and top $e$, of the passage leading from reservoir and cup, the form of all of which parts may be seen by reference to Figs. 1 and 2, where the glass is shown in the mold tinted blue. These parts of the mold are provided with a fastening $f$, $g$, by which they are secured when closed, and at the first stage of the operation they are placed upon a plate B, which is furnished with dowels $h$, $h$, to fit in holes $i$, $i$, made partly in A, and partly in A'. This plate B, constitutes the bottom of the mold and has a projecting piece $j$, standing up from it to form the interior of the passage which leads from the reservior to the burner cup. This piece $j$, does not quite complete the passage but it leaves it closed at $k$, the end next the reservoir, see Figs. 1, and 2, to be completed by a subsequent operation.

To perform the first part of the operation the parts A, A', B, of the mold when put together, are placed in a press such as is usually employed for pressing glass. This press has three pistons, the first C, being of such form as to produce the interior of the reservoir, the second D, being of annular form encircling the first one C, and fitting to a circular recess made in the top of A, A', and the third one E, being at a proper form to produce the interior of the burner cup and being attached to the second one D, by having a neck $l$, formed upon it to fit within a hole in D, and having a spiral spring $n$, applied to it above D, in such a manner as to raise it as high as is allowed by the shoulder below the said neck $l$. The first and second of these pistons resemble the two pistons commonly employed in pressing glass vessels. The third piston works in a guide formed in A, and A', above the cavity in which the burner cup is formed.

The operation is commenced by pouring into that part of the mold where the reservoir is formed, a sufficient quantity of glass, after which the pistons are brought down by proper means employed for that purpose, the pistons at first all moving together, the pistons C, and E, forcing the glass up both into that part of the mold where the reservoir is formed and through that part where the passage is formed up into the part where the burner cup is formed, and the piston D, preventing the overflow of the glass from the part of the mold where the reservoir is formed and acting on the glass to spread it laterally to fill all parts of the mold, but the pistons C, and E, having a further descent after the descent of D, terminates and thereby forcing the glass up to compress it tightly into the mold to bring up all the edges and corners sharp. The first part of the operation of the piston E, is produced by the piston D, pressing on the shoulder below the neck $l$, but after the movement of D, terminates, the further descent of E, is produced by an arm $m$, attached to the piston C, pressing on the top of it and overcoming the force of the spring

*n*. After this part of the operation has been performed the pistons are raised and the part A, A′, of the mold is taken by the handles *o*, *o*, *p*, and removed from the press and from the plate B, and placed on the bench by the workman who then with a part of the mold resembling a pair of tongs, proceeds with the next stage of the operation, the object of which is to remove the part *k*, which closes the passage from the reservoir to the cup. Before describing this operation I will remark that the reason for first making the passage closed next the reservoir is that I have found it difficult to make it in any other way, for if the piece *j*, were made to fit close to the piston with a view to making the passage completely open, the glass which gets between the piston C, and the piece *j*, before the descent of the piston terminates will prevent them coming together by reason of its fluidity not being sufficient to enable it to be forced out from between them and remaining there it does much injury to the piston, and the piece *j*, unless a considerable space is left for it. The same difficulty does not occur between the piston E, and the piece *j*, as the glass being forced from that part of the mold containing the piston C, toward that part containing the piston E, has no tendency to get between *j*, and E and in order to prevent wear I can leave just sufficient space between them as shown in Figs. 1, and 2, without any danger of glass getting between them.

The part of the mold for removing the piece of glass *k*, which closes the passage is shown, and its operation illustrated in Fig. 4, where F, is a straight piston corresponding in size with the piston E, and attached to one leg of a pair of tongs and G, is what may be termed a laterally moving piston attached to the other leg of the tongs, and having a form in its transverse section like the transverse section of the passage *d*, *d*, *e*. These tongs are made to close by a spring *t*. The piston F, is of such length as to allow the piston G, to move past its end, and it is provided on one side with a tongue or feather *q*, to work in a groove *r*, which is shown in dotted lines in Fig. 5, to serve as a guide to bring the piston G, to its proper position relatively to the other portion of the mold. The workman takes the tongs in his hands, open or with the piston G, moved away from F, as shown in red outline in Fig. 4, and inserts the piston F, into the guide in A, A′, as far as is allowed by the feather and groove, he then closes the tongs which causes the piston G, to cut out the part *k*, and drive it through the passage *d*, *d*, *e*, as is illustrated in Fig. 4. Then with the tongs still remaining in the same condition with the piston G, in the passage he inverts the mold and applies to its bottom a plate H, which is represented in Fig. 5, in section and in Fig. 6, in red outline. This plate is furnished with dowels *v*, *v*, to fit to holes in the parts A, A′, of the mold and with a suitable handle, and it has a hole *s*, *s*, of square or other form, which is rather larger than, and which comes over the opening which has been left in the bottom of the passage by the part *j*, of the mold which formed the principal part of the passage. Into the hole *s*, *s*, in the plate H, which forms a box, the workman puts a piece of glass in a sufficiently melted state, and then with a small piston I, which he takes in his hand and which fits the box *s*, *s*, he presses the glass into the opening of the passage, as is shown in Fig. 5, the glass employed to close the opening being prevented spreading laterally by being confined within the box *s*, *s*, and prevented being forced into the passage by the piston G, remaining therein. The plate H, and piston I, may now be taken away and the tongs be opened to draw the piston G, out of the passage and then drawn out altogether from the mold. The fastening *f*, *g*, is to be then undone and the parts A, A′, opened to let out the casting. The upper part of the reservoir is afterward closed to complete the lamp which may have a glass handle or pedestal applied to it as may be desired, but these last named operations are performed in a manner and by means well known.

The mold may be in some degree modified as for instance, the laterally moving piston G, may be attached by a pivot to one or both parts A, A′, of the mold which would occupy about the same position relatively to the mold that the pivot *a*, of the tongs is shown to occupy in Fig. 1. The laterally moving piston would in that case work into a recess provided for it in the piston C, where it would remain until the compression of the glass by the pistons C, D, E, should have been finished and then it would be forced outward by some suitable means to complete the passage. The piston G, under this arrangement as in the other, must remain in the mold until the hole at the bottom of the passage is closed, as the exclusion from the passage of the glass employed for that purpose is not the least important part of its duty. Another modification of the mold may be made by attaching the piston E, rigidly to the piston C, still letting it work through the piston D, as shown in the drawing but without shoulder or spring.

What I claim as my invention, and desire to secure by Letters Patent, is,

The mold composed of the several parts herein specified, combined and operating substantially as described.

HENRY W. ADAMS.

Witnesses:
JAMES F. BUCKLEY,
WM. TUSCHE.